(12) United States Patent
Liu et al.

(10) Patent No.: US 11,069,047 B2
(45) Date of Patent: Jul. 20, 2021

(54) IMAGE PROCESSING METHOD, IMAGE PROCESSING APPARATUS, COMPUTING DEVICE AND COMPUTER-READABLE STORAGE MEDIUM

(71) Applicant: BOE TECHNOLOGY GROUP CO., LTD., Beijing (CN)

(72) Inventors: Hanwen Liu, Beijing (CN); Pablo Navarrete Michelini, Beijing (CN); Lijie Zhang, Beijing (CN); Dan Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 116 days.

(21) Appl. No.: 16/447,547

(22) Filed: Jun. 20, 2019

(65) Prior Publication Data

US 2020/0126205 A1    Apr. 23, 2020

(30) Foreign Application Priority Data

Oct. 18, 2018   (CN) .......................... 201811216933.9

(51) Int. Cl.
| | |
|---|---|
| G06K 9/46 | (2006.01) |
| G06K 9/62 | (2006.01) |
| G06T 7/00 | (2017.01) |
| G06N 3/08 | (2006.01) |
| G06T 3/40 | (2006.01) |

(52) U.S. Cl.
CPC .......... *G06T 7/0002* (2013.01); *G06K 9/4609* (2013.01); *G06K 9/6256* (2013.01); *G06N 3/08* (2013.01); *G06T 3/4046* (2013.01); *G06T 2207/20016* (2013.01); *G06T 2207/20084* (2013.01)

(58) Field of Classification Search
CPC combination set(s) only.
See application file for complete search history.

(56) References Cited

U.S. PATENT DOCUMENTS

| 10,019,642 | B1 * | 7/2018 | Navarrete Michelini .................. G06T 3/4053 |
|---|---|---|---|
| 10,515,435 | B2 * | 12/2019 | Navarrete Michelini .................. G06N 3/0454 |
| 2017/0278289 | A1 * | 9/2017 | Marino .................... G06T 11/60 |
| 2018/0204121 | A1 * | 7/2018 | Wang ....................... G06N 3/10 |
| 2018/0357800 | A1 * | 12/2018 | Oxholm ................. G06N 3/084 |

(Continued)

FOREIGN PATENT DOCUMENTS

CN    109426858 A    3/2019

OTHER PUBLICATIONS

Johnson et al., "Perceptual Losses for Real-Time Style Transfer and Super-Resolution", downloaded from https://arxiv.org/pdf/1603.08155.pdf, Mar. 27, 2016, 18 pp.

*Primary Examiner* — Tsung Yin Tsai
(74) *Attorney, Agent, or Firm* — Myers Bigel, P.A.

(57) ABSTRACT

An image processing method implemented by a computing device is described herein, which includes acquiring an image to be processed and a target style of image, the image to be processed being an image of a second resolution level, and inputting the image to be processed and the target style into a trained image processing neural network for image processing to obtain a target image of the target style, the target image being an image of a first resolution level. The resolution of the image of the first resolution level is higher than that of the image of the second resolution level.

8 Claims, 5 Drawing Sheets acquiring an image to be processed and a target style of image, wherein the image to be processed is an image of a second resolution level — S301 inputting the image to be processed and the target style into a trained image processing neural network for image processing to obtain a target image of the target style — S302

(56) References Cited

U.S. PATENT DOCUMENTS

| 2019/0026870 A1* | 1/2019 | Hu ............................ G06T 11/00 |
| 2019/0141353 A1* | 5/2019 | Michelini ............. H04N 19/635 |
| 2019/0220746 A1* | 7/2019 | Liu ............................ G06N 3/08 |
| 2020/0057921 A1* | 2/2020 | Navarrete Michelini .................... H04N 19/182 |

* cited by examiner

IMAGE PROCESSING METHOD, IMAGE PROCESSING APPARATUS, COMPUTING DEVICE AND COMPUTER-READABLE STORAGE MEDIUM

CROSS REFERENCE TO RELATED APPLICATION

The present application claims the benefit of Chinese Patent Application CN201811216933.9 filed on Oct. 18, 2018, the entire disclosure of which is incorporated herein by reference.

TECHNICAL FIELD

The present disclosure relates to the technical field of image processing, in particular to an image processing method, an image processing apparatus, a computing device and a computer-readable storage medium.

BACKGROUND

Deep learning technology has made rapid progress in the past few years. Some giant enterprises have invested huge capital and manpower in researches of deep learning technology, and continuously introduced their unique products and technologies. Deep learning technology has made breakthroughs in the field of human-like data perception, such as describing image contents, recognizing objects in complex environments in images and speech recognition in noisy environments.

SUMMARY

The present disclosure provides an image processing method, an image processing apparatus, a computing device and a computer-readable storage medium so as to convert an image to be processed into a high-resolution image with a target style.

According to a first aspect of the present disclosure, an image processing method implemented by a computing device is provided, which comprises:

acquiring an image to be processed and a target style of image, the image to be processed being an image of a second resolution level;

inputting the image to be processed and the target style into a trained image processing neural network for image processing to obtain a target image of the target style, the target image being an image of a first resolution level;

wherein the image of the first resolution level has a higher resolution than the image of the second resolution level.

According to a second aspect of the present disclosure, an image processing apparatus is provided, which comprises:

an acquirer configured to acquire an image to be processed and a target style of image, the image to be processed being an image of a second resolution level;

a first processor configured to input the image to be processed and the target style into a trained image processing neural network for image processing to obtain a target image of the target style, the target image being an image of a first resolution level;

wherein the image of the first resolution level has a higher resolution than the image of the second resolution level.

According to a third aspect of the present disclosure, a computing device is provided, which comprises:

a memory having computer-executable instructions stored thereon;

a processor configured to execute the computer-executable instructions so as to carry out the image processing method as described in the first aspect.

According to a fourth aspect of the present disclosure, a computer-readable storage medium is provided, wherein the computer-readable storage medium stores computer-executable instructions which, when being executed, can carry out the image processing method as described in the first aspect.

BRIEF DESCRIPTION OF THE DRAWINGS

From the following detailed description of the embodiments, various advantages and benefits of the present disclosure will become clearer to those skilled in the art. The drawings are only used for illustrating the embodiments, but they do not intend to limit the present disclosure. The same reference signs are used to denote the same elements throughout the drawings. In the drawings.

DETAILED DESCRIPTION OF EMBODIMENTS

Embodiments of the present disclosure will be described below with reference to the drawings. It shall be understood that the embodiments are exemplary and are only provided for explaining the present disclosure, but they cannot be construed as limiting the present disclosure.

Those skilled in the art shall understand that unless specifically stated, the indefinite article "a" or "an" does not exclude a plurality. It shall be further understood that the wordings "include" and "comprise" used in the specification of the present disclosure indicate the existence of features, integers, steps, operations, elements and/or assemblies, but they do not mean to exclude the existence of one or more other features, integers, steps, operations, elements, assemblies and/or combinations thereof. It shall be appreciated that when an element is "connected" or "coupled" to another element, it may be connected or coupled directly to said another element or through an intermediate element. In addition, the connection or coupling herein may include wireless connection or wireless coupling.

Those skilled in the art shall understand that unless otherwise defined, all terms (including technical terms and scientific terms) used herein are of general significance to those with common skills in the field to which the present disclosure belongs. It should also be understood that terms such as those defined in a general dictionary shall be understood to have meanings consistent with those in the context of related art, and will not be interpreted in idealized or over-formal terms unless specifically defined herein.

In order to make the object, technical solution and advantages of the embodiments of the present disclosure clearer, embodiments of the present disclosure will be described in further detail below with reference to the drawings.

In related art, the use of deep neural network to transfer the artistic style of pictures is a new technology emerged with the development of deep learning technology. Now three representative solutions will be introduced briefly:

Solution 1: some applications (e.g. Prisma application) for style transformation of photos can usually transform users' photos into pictures with a specific artistic style in seconds. But the pictures produced by such applications have poor effects, and the degree of style enhancement is not significant.

Solution 2: the convolutional neural network VGG (Visual Geometry Group) is used to extract content and style features of the pictures, which are used as a loss to train another convolutional neural network, then output pictures having better effects can be obtained in seconds, but this kind of processing can only process and output images of lower resolution.

Solution 3: on the basis of the above solution 2, the idea of chroma sampling is used to process the YUV channels of an image in the YUV chroma space, meanwhile the network sizes of U and V channels are reduced, which is similar to the idea of YUV422. This solution can obtain results similar to those from solution 2 while greatly speeding up the processing. However, said solution 3 does not deal with the image resolution, so it does not solve the problem of solution 2, namely, high-resolution images cannot be processed and output.

An embodiment of the present disclosure can output a high-resolution image by combining the convolutional neural network, super-resolution technology and style transfer technology. Compared with the above-mentioned solutions 2 and 3, the technical solution of the present disclosure further designs a branch that simultaneously realizes style transfer and super-resolution on the basis of the classical style transfer network, such that the two branches can output stylized low-resolution images and stylized high-resolution images, respectively.

Some of the terms used herein are explained below.

Figure 1:
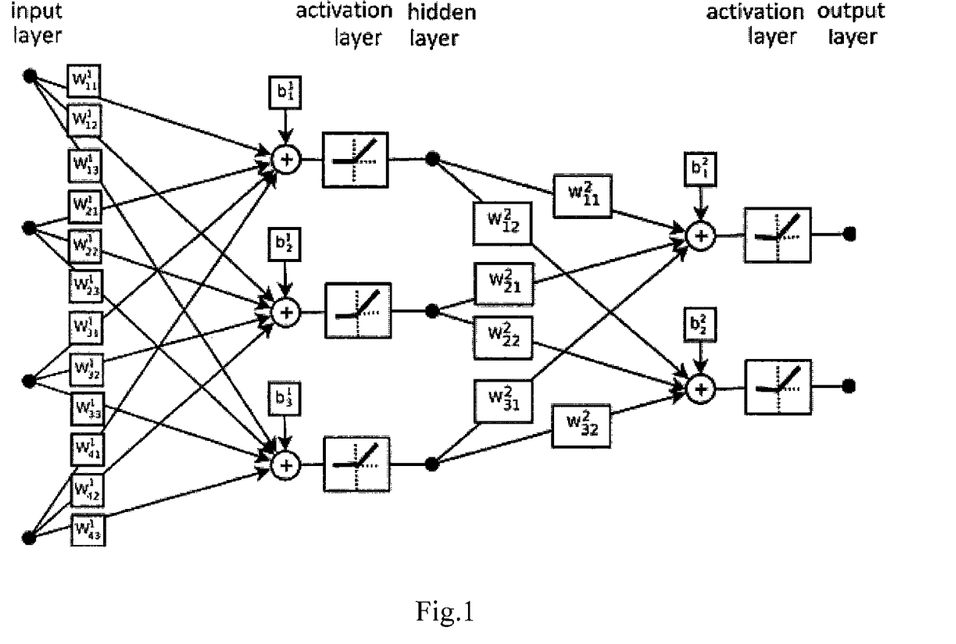
FIG. 1 is a structural diagram of a convolutional neural network in the related art.

Convolutional Neural Network It is a special structure of neural network, in which images can be used as inputs and outputs of the convolutional neural network, and the convolutional kernel is used to replace the scalar weight of the traditional neural network. As an example, a three-layer convolutional neural network is shown in FIG. 1. The three layers are an input layer, a hidden layer and an output layer. As shown in FIG. 1, the input layer of the network has four inputs (indicated by the four black dots below the input layer in FIG. 1), the hidden layer has three outputs (indicated by the three black dots below the hidden layer in FIG. 1), and the output layer has two outputs (indicated by the two black dots below the output layer in FIG. 1), and finally the system outputs two images. $w_g^k$ represents a weight parameter of the convolutional kernel. k represents the serial number of the layer, i and j represent the serial numbers of the parameters in the layer, where k, i and j are positive integers. Offsets $b_i^k$ are a group of scalars superimposed on the outputs of the convolutional layer. The outputs of the convolutional layer having the offsets superimposed thereon will then enter an activation layer (usually RELU or sigmoid functions). After training, the convolutional kernel and offset of the system are fixed. Training is to optimize the parameters of the convolutional kernel and offsets through a group of matching inputs and outputs and an optimization algorithm. Generally speaking, each convolutional layer may contain dozens or hundreds of convolutional kernels, and a deep neural network usually contains more than five convolutional layers.

Pooling Layer

The pooling layer is a form of down-sampling, which can reduce the sizes of features obtained by convolution. Common pooling layers include max-pooling, avg-pooling, decimation and demuxout.

Flatten Layer

The Flatten layer is used for transforming 2D feature images into 1D feature images, and data of the 1D feature images can be output to a full connection layer. The formula of the Flatten layer is:

$$v_k = f_{k/j,k\%j}$$

where, v is a vector containing k elements, f is a matrix consisting of i rows and j columns, wherein k, i and j are positive integers.

Averaging layer and full connection layer (FCN)

The averaging layer uses average values of the feature images to represent images, and a 2D feature will become a scalar after being processed by the averaging layer.

The full connection layer has the same structure as the convolutional neural network, only that the convolutional kernel is replaced by a scalar value.

Softmax Layer

The Softmax (smoothing maximum conversion function) layer is a generator of logic functions, which can compress a K-dimensional vector z containing any real number into a K-dimensional vector σ(z). σ(z) includes real numbers within the range of (0, 1) and the sum of all elements is 1. The formula of Softmax is:

$$\sigma(z)_j = \frac{e^{z_j}}{\sum_{k=1}^{K} e^{z_k}}, j = 1, 2, \ldots, k.$$

Muxer Layer

Figure 2:
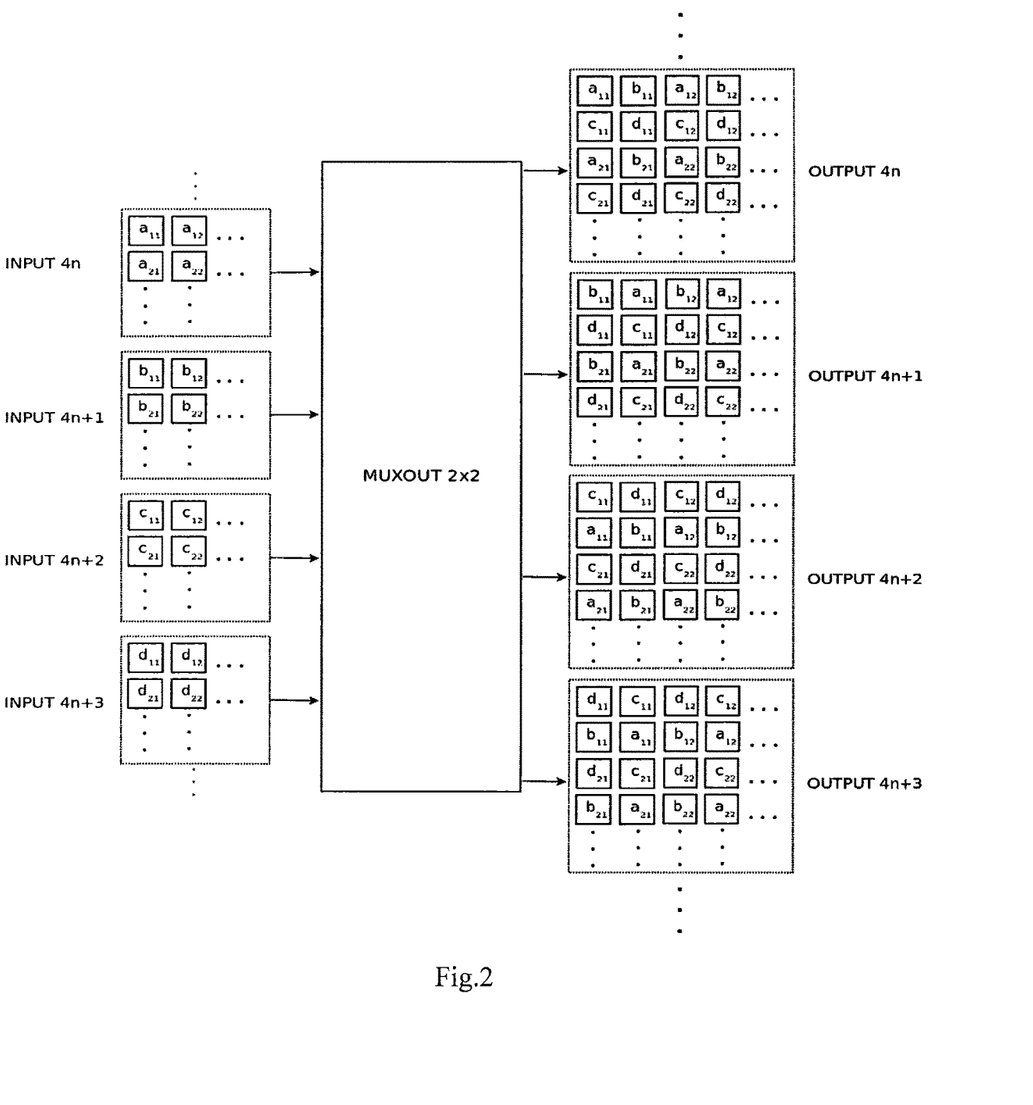
FIG. 2 is a structural diagram of an up-sampling Muxer layer provided in an embodiment of the present disclosure.

Muxer layer can be used for up-sampling in the convolutional neural network. Said layer takes several inputs, then alternately rearranges their pixel values, and generates the same number of outputs. The number of feature images remains unchanged after the Muxer layer processing, but the size of each feature image increases by four times (depending on the up-sampling multiple, 2 times here as an example). Thus, the Muxer layer adds more information through different permutations and combinations, so that subsequent processing layers (i.e., all subsequent convolutional layers for feature extraction and processing) can select certain combinations through the activation layer. FIG. 2 shows a 2×2 up-sampling Muxer layer.

Instance Normalization Layer

The instance normalization layer is used to normalize the feature images output from the convolutional layer. According to the mean and variance of each feature image, the instance normalization layer normalizes the feature image. Assuming that the mini-batch input size of the neural network is T, the number of features output by a certain convolutional layer is C, and each feature image is a matrix of H rows and W columns, then the shape of the feature image is (T, C, W, H). Thus the normalized formulae of the instance normalization layer are as follows:

$$y_{tijk} = \frac{x_{tijk} - \mu_{ti}}{\sqrt{\sigma_{ti}^2 + \varepsilon}}, \mu_{ti} = \frac{1}{HW} \sum_{l=1}^{W} \sum_{m=1}^{H} x_{tilm},$$

$$\sigma_{ti}^2 = \frac{1}{HW} \sum_{l=1}^{W} \sum_{m=1}^{H} (x_{tilm} - m\mu_{ti})^2$$

wherein, $x_{tijk}$ is the value of an $i^{th}$ feature image of a $t^{th}$ patch at a $j^{th}$ column and a $k^{th}$ row among a set of feature images output by a certain convolutional layer. $y_{tijk}$ represents a result obtained by inputting $x_{tijk}$ into the instance normalization layer. $\varepsilon$ is a very small non-zero integer to avoid 0 denominator.

Merge Module

The merge module is used to transform a YUV image into a RGB image, and its standard formula is as follows:

$$\begin{bmatrix} R \\ G \\ B \end{bmatrix} = \begin{bmatrix} 1 & 0 & 1.13983 \\ 1 & -0.39465 & -0.58060 \\ 1 & 2.03211 & 0 \end{bmatrix} \begin{bmatrix} Y \\ U \\ V \end{bmatrix}.$$

Figure 3:
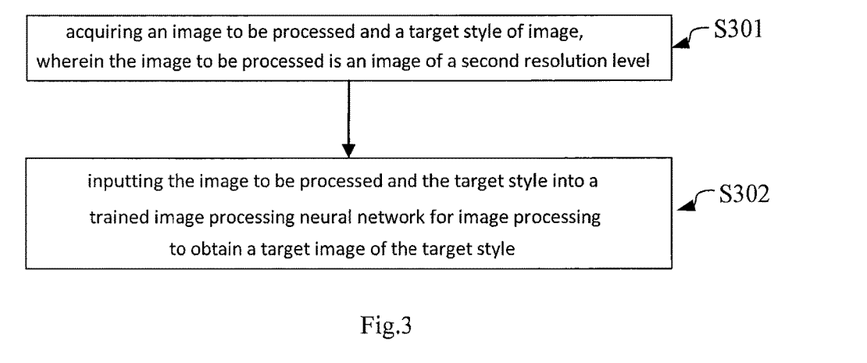
FIG. 3 is a flow chart of an image processing method provided in an embodiment of the present disclosure.

FIG. 3 is a flow chart of an image processing method provided in an embodiment of the present disclosure, said method being used in a computing device. The method includes the following steps:

Step S301: acquiring an image to be processed and a target style of image, wherein the image to be processed is an image of a second resolution level;

Step S302: inputting the image to be processed and the target style into a trained image processing neural network for image processing to obtain a target image of the target style.

The target image is an image of a first resolution level, wherein the resolution of the image of the first resolution level is higher than that of the image of the second resolution level.

In the embodiment of the present disclosure, a high-resolution image having the target style is obtained by using the trained image processing neural network to process the image to be processed. Compared to the image processing methods in related art, the processing efficiency is improved, the output of high-resolution images is realized, and the user's experience is improved.

It should be noted that the image of the first resolution level, the image of the second resolution level and the image of the third resolution level that will be mentioned below refer to images with different resolutions, and the resolution corresponding to the image of the first resolution level is higher than that corresponding to the image of the second resolution level, and the resolution corresponding to the image of the second resolution level is the same as that of the image of the third resolution level. The resolution level can be distinguished by high resolution and low resolution. For example, the high resolution and low resolution can be defined in the following ways: 1. a certain resolution (such as 640*480) is used as the bound, resolutions larger than said resolution are high resolutions, and resolutions smaller than said resolution are low resolutions; 2. a certain range is defined, for example, resolutions in the range of 160*120~640*480 are low resolutions, and resolutions in the range of 800*600~1366*768 are high resolution; 3. a comparison is made between two resolutions, for example, if two resolutions are 600*400 and 640*480, then the resolution of 640*480 is defined as the high resolution, and the resolution of 600*400 is defined as the low resolution. Of course, the above ways of defining the high resolution and low resolution are only to illustrate that the high resolution and low resolution are two different resolutions, and to make a distinction between the two resolutions. As for the examples given for the above ways of definition as well as the resolutions and ranges of resolutions mentioned therein, they are only examples for illustrating the corresponding ways of definition, but they do not represent the demarcation of high and low resolutions and ranges of resolution in said ways of definition.

In some embodiments, in step S301, the image to be processed is an image of the second resolution level and carries a specific style in itself. Meanwhile, the target style into which the style of the image to be processed is to be converted will be obtained, and said target style can be different from the specific style. For example, the target style can be obtained from the original style image.

For example, the style of image can be divided into Chinese style, European style, American style, Roman style, etc. by country; into ancient style, modern style and future style by age; into quiet style and cold style by painting style; or into Chinese painting, oil painting, print, watercolor painting, gouache, sketch, etc. by painting type. Of course, the above divisions of the style and the specific forms corresponding to each style are merely some examples given for illustrating the styles, but they do not mean to cover all the examples.

In an embodiment of the present disclosure, the acquired image to be processed may be an image input by the user, an image selected by the user from locally stored images, an image received from a server or the like. The target style can be a style input or selected by the user or a style acquired from the original style image.

By inputting the acquired image to be processed and the target style of the image into the trained image processing neural network for image processing, the image with the target style can be obtained. As an alternative, the acquired image to be processed (i.e., the original input image) and the original style image can also be input into the trained image processing neural network for image processing, thereby obtaining the image with the target style.

In an embodiment of the present disclosure, before processing with the image processing neural network, the image processing neural network needs to be trained, and the training process can be carried out, for example, in a computing device. Firstly, a large number of sample data are selected and input into the image processing neural network for ceaseless training, thereby continuously adjusting parameters of the image processing neural network, so that data output through the image processing neural network become more and more accurate until reaching the desired value. The trained image processing neural network can thus be obtained. Through the above training process, the output accuracy of the image processing neural network is improved.

The following is a more detailed and much clearer description of the training process of the image processing neural network. Since the composition of the convolutional neural network used in the embodiments of the present disclosure and the relationships among the layers thereof have been explained above, the details will not be elaborated here anymore. The training process includes the following steps:

Step A: acquiring sample data which may contain images for training.

In the embodiment of the present disclosure, before training the image processing neural network, a large number of sample data will be acquired, which may be an existing image data set that is manually input, extracted from a local storage, or obtained by sending an acquisition request for sample data to a server. Of course, these are not all the ways for acquiring the sample data.

Step B: training the image processing neural network using said sample data.

In the embodiment of the present disclosure, the training process may include the following steps B1 and B2. Said two steps are repeated until outputs of the trained neural network are as expected.

Step B1: inputting the sample data into the image processing neural network to be trained.

Firstly, an image sample selected from the sample data is input into the image processing neural network to be trained. The image processing neural network processes said image sample and outputs two images which retain the content of the image sample and contain some artistic style, one of the images is a first image having the same resolution as the image sample, and the other is a second image having a higher resolution than the image sample.

Figure 4:
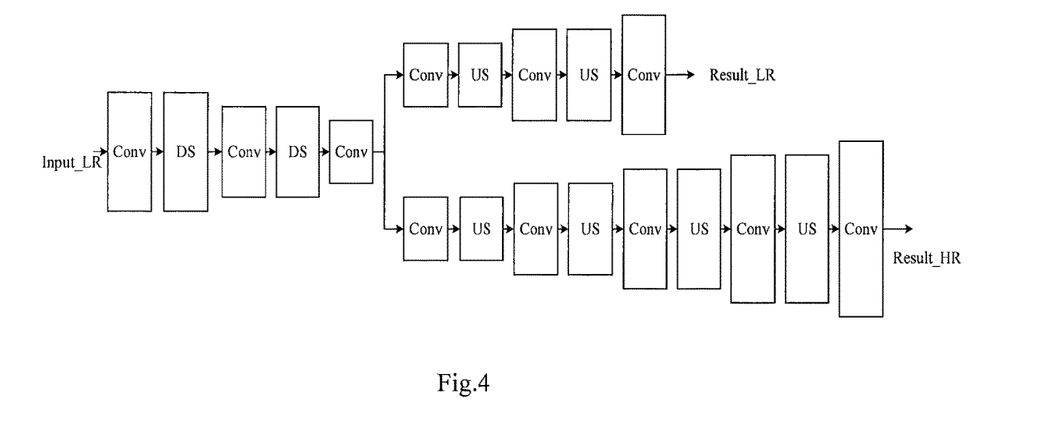
FIG. 4 is a structural diagram of an image processing neural network provided in an embodiment of the present disclosure.

The specific process thereof is as shown in FIG. 4, which includes the following:

an image (content image) used for training in the sample data is input into the image processing neural network to be trained. After processing, the image processing neural network outputs an image retaining the content of the content image and containing some artistic style. The image input into the image processing neural network is processed first by several convolutional layers, instance normalization layers and down-sampling layers to reduce the size of the feature image. Then, the feature image with reduced size is further processed by a network containing multiple convolutional layers, which can be a standard convolutional network, a residual unit based on a residual network or a dense unit based on a dense network. Then the neural network can be divided into two different branches: branch one, after being processing through multiple convolutional layers (e.g., through the same number of up-sampling layers, convolutional layers and instance normalization layers), outputs a stylized image (low-resolution image) having the same resolution as the input image for training; branch two, after being processed through multiple convolutional layers (e.g., through a larger number of up-sampling layers, convolutional layers and instance normalization layers than those for branch one (two more than the number for branch one in the example shown in FIG. 4)), outputs a stylized image with high resolution (high resolution image). Because the instance normalization layer is always used after the convolutional layer, for brevity, the "conv" block in FIG. 4 contains the convolutional layer and the instance normalization layer. The down-sampling and up-sampling layers in the system can be implemented by stride-convolution layers, MUXER (composite) layers, etc.

In an embodiment of the present disclosure, the above processing may include: processing the images for training in the sample data by using the image processing neural network to be trained so as to obtain the images of the first resolution level and the images of the second resolution level corresponding to the image for training.

Step B2: training the neural network based on a total loss.

In an embodiment of the present disclosure, the image processing neural network is trained using a loss function to obtain parameters (including but not limited to weight values in convolutional kernels) of the image processing neural network that can minimize the value of loss function.

Figure 5:
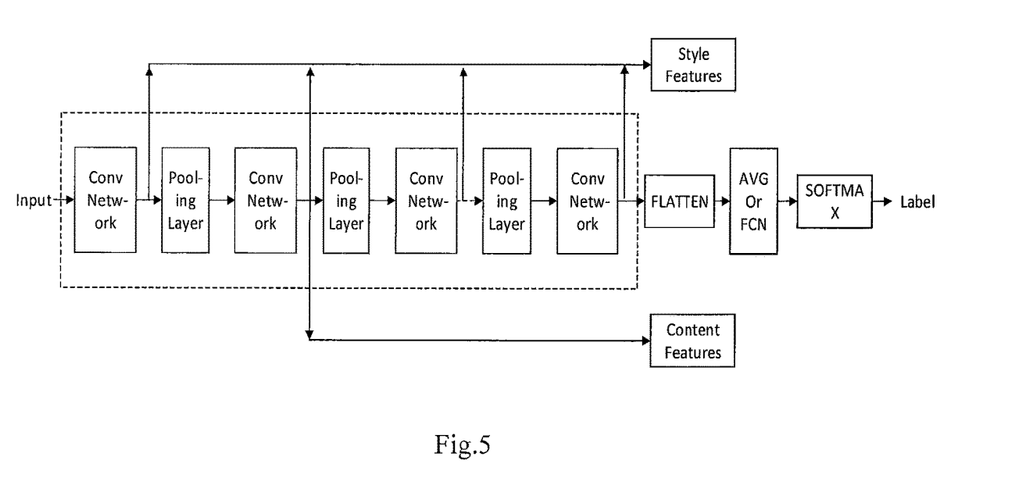
FIG. 5 is a structural diagram of an analytical neural network provided in an embodiment of the present disclosure.

An analytical neural network is used in the calculation of the loss function herein. The processing of the analytical neural network, as shown in FIG. 5, includes the following:

the input image is processed by several convolutional layers and pooling layers, and then processed by the flatten layer, the full connection layer and the Softmax layer, so that an label representing image category can be obtained. The output of each convolutional layer is a feature extracted from the input image. The pooling layer reduces the resolution of the feature image and passes it to the next convolutional layer. In this way, the feature image processed by each convolutional layer represents features (such as texture, edge, object, etc.) of the input image at different levels. After being processed by several convolutional layers and pooling layers, the feature image is transformed by the flatten layer into vectors to be passed to the full connection layer. Finally, the probabilities of the input image belonging to each of the labels are output through the SoftMax layer, wherein the label with the greatest probability will be the final output of the analytical neural network.

In this analytical neural network, parts of the convolutional layer and the pooling layer can be intercepted to extract image features of input image, which include content features and style features. Style features can be extracted from several convolutional layers, and content features can be extracted from a certain convolutional layer.

Figure 6:
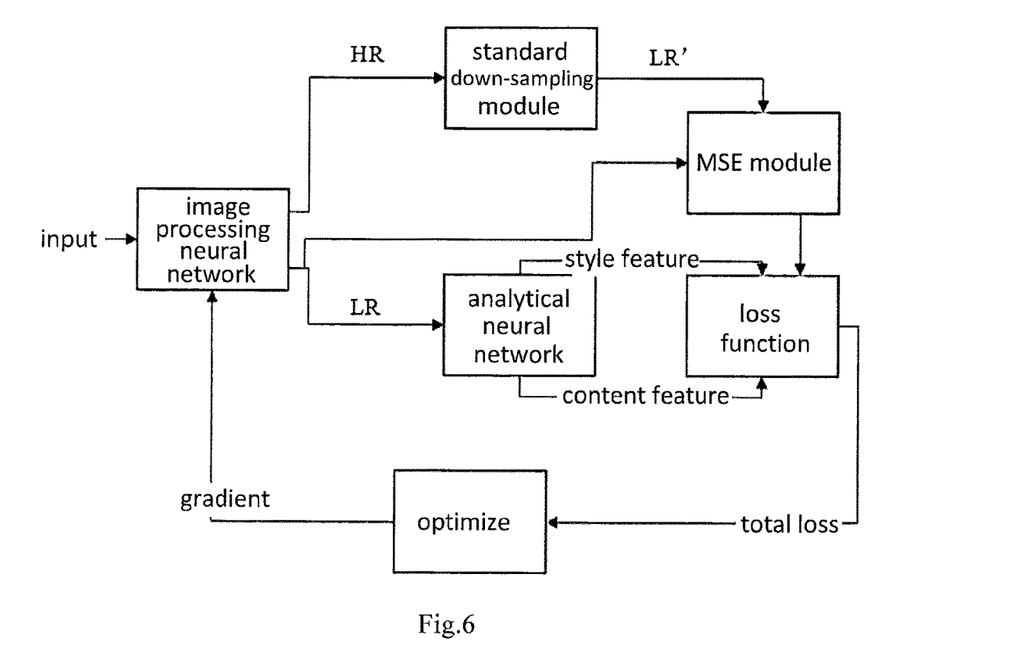
FIG. 6 is a schematic diagram of training an image processing neural network provided in an embodiment of the present disclosure.

The training process of the image processing neural network in the above-mentioned embodiment of the present disclosure, as shown in FIG. 6, includes the following:

the input image is input into the image processing neural network so as to generate the low resolution image LR and the high resolution image HR. The input image and the low resolution image LR are both put into the above-mentioned analytical neural network to obtain their respective content features and style features. Meanwhile, the image HR is down-sampled to have the same resolution as the image LR by means of a standard down sampling module, thus obtaining a low resolution image LR' (i.e. the image of the third resolution level as mentioned previously); then a similarity between LR and LR' is calculated by an MSE module. Finally, the total loss function is calculated by using the calculated content features, the style features and the similarity.

As mentioned above, the loss function includes content loss, style loss, MSE loss and L1 loss, which will be described in detail below.

Content Loss:

In the analytical neural network, the output of each convolutional layer is the feature image of the input image. Suppose that the output of a convolutional layer with $N_l$ convolutional kernels contains $N_l$ feature images, and the size of each feature image is $M_l$ (width×height of the feature image), where l is the index of the layer of the analytical network. In this case, the output of l layers can be stored in the matrix $F^l \in R^{N_l \times M_l}$. $F_{ij}^l$ represents the value of the $j^{th}$ position in the feature image output from the $i^{th}$ convolutional kernel in the $l^{th}$ layer.

$\vec{p}$ and $\vec{x}$ are defined to be the original input image and the generated image, respectively, $P^l$ and $F^l$ are their feature images output from the $l^{th}$ layer in the analytical neural network, then the content loss can be defined as $$L_{content} = \frac{1}{2C1} \sum_{ij} (F_{ij}^l - P_{ij}^l)^2$$

wherein, C1 is a constant for normalizing the results.
Style Loss:
Gram matrix can be defined as $$G_{ij}^l = \sum_k F_{kj}^l F_{lk}^l$$

$\vec{a}$ and $\vec{x}$ are defined to be the original style image and the generated image, respectively, and $A^l$ and $G^l$ are their Gram matrixes output from the $l^{th}$ layer in the analytical neural network, then the style loss of said layer can be defined as $$E_l = \frac{1}{4N_l^2 M_l^2 C2} \sum_{i,j} (G_{ij}^l - A_{ij}^l)^2$$

wherein, C2 is a constant for normalizing the results. The total style loss is:

$$L_{sytle} = \sum_{l=0}^{L} w_l E_l$$

wherein $w_l$ is a weight of the style loss of the $l^{th}$ layer among the total style loss.
MSE (Mean Square Error) Loss:
The output of the image processing neural network includes the low resolution stylized image LR and the high resolution stylized image HR. These two images are expected to have exactly the same content and style, and the content and style of LR are constrained by the content loss and style loss described above. Therefore, in the embodiment of the present disclosure, it is necessary to ensure that the image LR' obtained from down-sampling HR has the same pixel level as LR, and the mean square error MSE is used for constraining here.

$$L_{MSE} = \frac{\sum_i \sum_j (LR_{ij} - LR'_{ij})^2}{i \times j}$$

wherein, image LR' is an image obtained by adjusting the resolution the image HR to be the same as the resolution of the image LR, i and j are the width and height of images LR and LR', $LR_{ij}$ refers to the pixel value of image LR at position (i,j).
L1 Loss:
In the convolutional neural network, the weight parameter and offset parameter of the convolutional kernel are parameters obtained through system training. The convolutional kernel determines how the input image should be processed, and the offset determines whether the output of the convolutional kernel is input into the next layer. Therefore, in the convolutional neural network, the offset can be figuratively compared to a "switch", which determines whether the convolutional kernel is "ON" or "OFF". For different input images, the system turns on or off different convolutional kernels to achieve a variety of different effects.

In the embodiment of the present disclosure it is desirable that the offset has a larger absolute value than the convolutional kernel, so that the "switch" function can be more effectively played, so the L1 loss is defined in the following ways herein.

First, a mean of absolute values of all convolutional kernels in the system is calculated:

$$W = \frac{\sum \|w\|}{C_w}$$

wherein, $C_w$ is the number of the convolutional kernels in the system.
Then, a mean of absolute values of all offsets in the system is calculated:

$$B = \frac{\sum \|b\|}{C_b}$$

wherein, $C_b$ is the number of the offsets in the system.
Finally, the L1 loss is calculated by the function of:

$$L_{L1} = \frac{W}{B + \varepsilon}$$

wherein $\varepsilon$ a minimal positive number to ensure that the denominator is not zero.
On this basis, the total loss function can be calculated as:

$$L_{total} = \alpha L_{content} \beta L_{style} + \gamma L_{L1} + \mu L_{MSE}$$

wherein, $\alpha$, $\beta$, $\chi$ and $\mu$ are the weights of the content loss, style loss, L1 loss and MSE loss among the total loss.

For embodiments of the present disclosure, the above processing includes:
calculating a similarity between the images of the second resolution level and the images of the third resolution level;
obtaining the total loss function of the image processing neural network based on pre-configured feature information and the similarity;
training the image processing neural network based on the total loss function to obtain the trained image processing neural network.

In some embodiments, the pre-configured feature information includes the first feature information corresponding to the images for training and the second feature information corresponding to the images of the second resolution level, wherein the first feature information includes the content feature information and style feature information corresponding to the images for training, and the second feature information includes the content feature information and style feature information corresponding to the images of the second resolution level.

The first feature information and the second feature information can be determined by the following steps:
inputting the images for training into a preset analytical neural network for processing to obtain the first feature information corresponding to the images for training;

inputting the images of the second resolution level into the preset analytical neural network for processing to obtain the second feature information corresponding to the images of the second resolution level.

Further, training the image processing neural network based on the total loss function to obtain the trained image processing neural network comprises:

adjusting corresponding parameters of the image processing neural network to minimize the total loss function, thereby obtaining the trained image processing neural network.

In some embodiments, the process of minimizing the total loss function can be implemented using various algorithms, such as the gradient descent algorithm.

Figure 7:
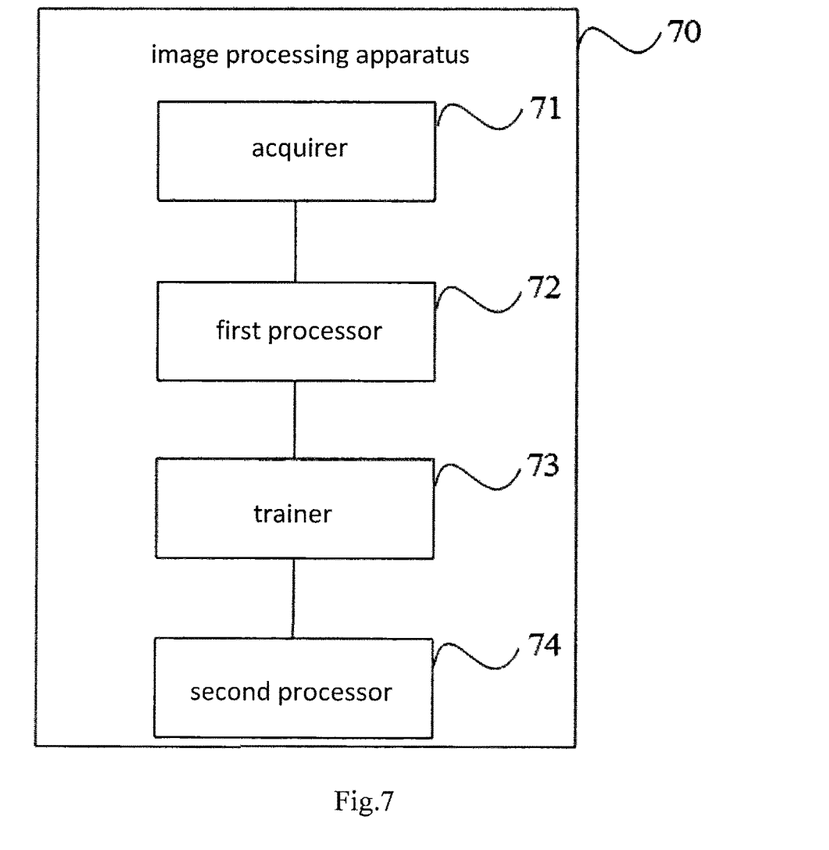
FIG. 7 is a structural diagram of an image processing apparatus provided in an embodiment of the present disclosure.

FIG. 7 is a structural diagram of an image processing apparatus provided in an embodiment of the present disclosure. An image processing apparatus 70 in the embodiment of the present disclosure may comprise an acquirer 71, a first processor 72, a trainer 73 and a second processor 74.

The acquirer 71 is configured to acquire an image to be processed and a target style of image, the image to be processed being an image of a second resolution level.

The first processor is configured to input the image to be processed and the target style into the trained image processing neural network for image processing so as to obtain a target image of the target style, the target image being an image of a first resolution level.

The image of the first resolution level has a higher resolution than the image of the second resolution level.

In some embodiments, the acquirer 71 is further configured to acquire sample data, which include images for training; the trainer is further configured to train the image processing neural network based on the sample data to obtain the trained image processing neural network.

In some embodiments, the trainer 73 is configured to input images for training in the sample data into the image processing neural network for processing, thereby obtaining the images of the first resolution level and the images of the second resolution level corresponding to the images for training; calculate a total loss function for the image processing neural network based on the images of the first resolution level and the images of the second resolution level; and train the neural network based on the total loss function so as to obtain the trained image processing neural network.

In some embodiments, the trainer 73 is further configured to adjust the resolution of the images of the first resolution level based on the images of the second resolution level to obtain the images of the third resolution level having the same resolution as the images of the second resolution level; calculate the similarity between the images of the second resolution level and the images of the third resolution level; and obtain the total loss function of the image processing neural network based on pre-configured feature information and the similarity.

In some embodiments, the pre-configured feature information includes the first feature information corresponding to the images for training and the second feature information corresponding to the images of the second resolution level, wherein the first feature information includes the content feature information and style feature information corresponding to the images for training, and the second feature information includes the content feature information and style feature information corresponding to the images of the second resolution level.

In some embodiments, the second processor 74 is further configured to input the images for training into the preset analytical neural network for processing, thereby obtaining the first feature information corresponding to the images for training; and to input the images of the second resolution level into the preset analytical neural network for processing, thereby obtaining the second feature information corresponding to the images of the second resolution level.

In some embodiments, the trainer 7 is further configured to adjust the corresponding parameters of the neural network to minimize the total loss function, thereby obtaining the trained image processing neural network.

In the embodiment of the present disclosure, the image to be processed and the target style of the image are acquired, the image to be processed being the image of the second resolution level; the image to be processed and the target style are input into the trained image processing neural network for image processing to obtain the target image of the target style, the target image being the image of the first resolution level; wherein, the resolution of the image of the first resolution level is higher than that of the image of the second resolution level. By introducing the preset image processing neural network to process the image to be processed, the high-resolution image with the target style is obtained, and compared to the image processing methods in the related art, the processing efficiency is improved, the output of high-resolution images is realized, and the user's experience is improved.

Figure 8:
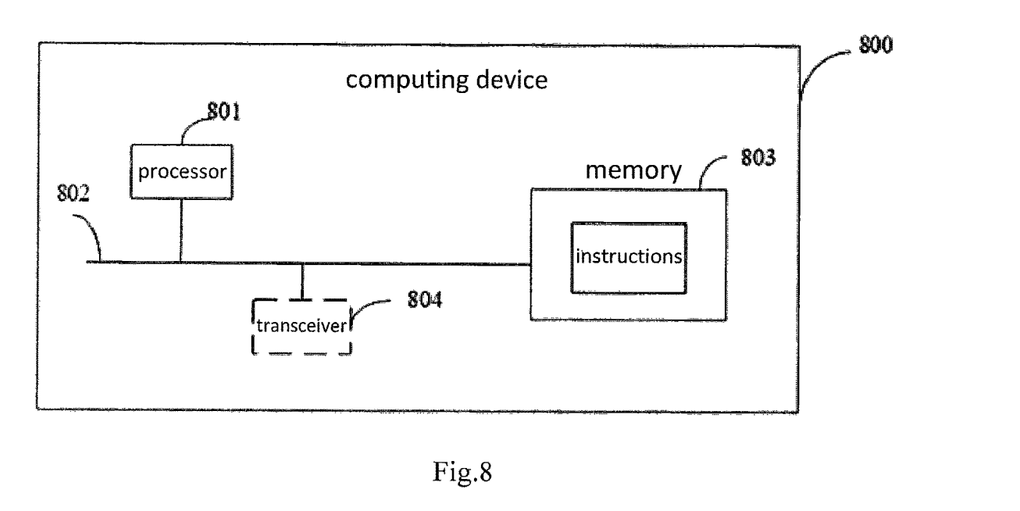
FIG. 8 is a structural diagram of a computing device for implementing the image processing method provided in an embodiment of the present disclosure.

An embodiment disclosed herein provides a computing device, as shown in FIG. 8. The computing device 800 shown in FIG. 8 includes a processor 801 and a memory 803. The processor 801 and the memory 803 are connected, such as through a bus 802. Optionally, the computing device 800 may also include a transceiver 804. It shall be noted that the transceiver 804 is not limited to one in practical application, and the structure of the computing device 800 does not constitute a limitation to the embodiments disclosed herein.

The processor 801 is applied to the embodiments of the present disclosure to achieve the functions of the acquirer 71, the first processor 72, the trainer 73 and the second processor 74 as shown in FIG. 7. The transceiver 804 may include a receiver and a transmitter.

The processor 801 can be a CPU, a general purpose processor, a DSP, an ASIC, an FPGA or other programmable logic devices, transistor logic devices, hardware components or any combinations thereof. The processor may implement or execute various exemplary logical boxes, modules and circuits described in conjunction with the present disclosure. The processor 801 can also be a combination for realizing computing functions, such as a combination including one or more microprocessors, a combination of DSPs and microprocessors, etc.

The bus 802 may include a path through which information is transmitted among the above-mentioned components. The bus 802 can be a PCI bus or an EISA bus, etc. The bus 802 can be divided into address bus, data bus, control bus, etc. For ease of presentation, only one thick line is used to represent the bus in FIG. 8, but it does not mean that there is only one bus or one type of bus.

The memory 803 can be, but is not limited to, a ROM or other types of static storage devices that can store static information and instructions, a RAM or other types of dynamic storage devices that can store information and instructions, an EEPROM, a CD-ROM or other optical disc storages (including compact discs, laser discs, optical discs, digital general purpose discs, Blue-ray discs, etc.), a magnetic disc storage medium or other magnetic storage devices, or any other mediums capable of carrying or storing desired codes in the form of instructions or data structures and accessible by a computer.

The memory 803 is used to store computer-executable instructions that implement the technical solution of the present disclosure and is executed by the processor 801. The processor 801 is used to execute the computer-executable instructions stored in the memory 803 so as to implement the image processing method illustrated in the embodiments of the present disclosure as described above.

An embodiment of the present disclosure also provides a computer-readable storage medium on which computer-executable instructions are stored, said computer-executable instructions, when being executed, implement the image processing method illustrated in the embodiments of the present disclosure as described above.

In the embodiment of the present disclosure, the image to be processed and the target style of the image are acquired, the image to be processed being the image of the second resolution level; the image to be processed and the target style are input into the trained image processing neural network for image processing to obtain the target image of the target style, the target image being the image of the first resolution level; wherein, the resolution of the image of the first resolution level is higher than that of the image of the second resolution level. By introducing the trained image processing neural network to process the image to be processed, the high-resolution image with the target style is obtained, and compared to the image processing methods in the related art, the processing efficiency is improved, the output of high-resolution images is realized, and the user's experience is improved.

Those skilled in the art shall understand that computer instructions can be used to implement each block in the structure diagrams and/or block diagrams and/or flow charts, as well as combinations of the blocks in the structure diagrams and/or block diagrams and/or flow charts. It will be understood by those skilled in the art that the computer instructions can be provided to processors of general purpose computers, special purpose computers or other programmable data processing devices to be executed, so that the schemes in one or more blocks in the structure diagrams and/or block diagrams and/or flow charts of the present disclosure can be implemented by the processors of the computer or other programmable data processing devices.

Modules of the apparatus of the present disclosure may be integrated or separately deployed. Said modules can be combined into one module or further divided into several sub-modules.

Those skilled in the art shall understand that the appended drawings are only schematic drawings of the embodiments, and that the modules or flows in the drawings are not necessarily indispensable for the implementation of the present disclosure.

It will be understood by those skilled in the art that the modules in the apparatus in one embodiment may be distributed in the apparatus of the embodiment, or they may be changed to be distributed in one or more apparatuses different than the apparatus of the embodiment. The modules in the apparatus in the embodiment may be combined into one module or further split into multiple sub-modules.

The serial numbers referred to in the above disclosure are merely for description and do not imply superiority of the embodiments.

Only several specific embodiments are disclosed above, but the present disclosure is not limited to these embodiments. Any modification or substitution that can be conceived by those skilled in the art under the spirit of the present disclosure shall fall within the scope of protection of the present disclosure.

The invention claimed is:

1. An image processing method implemented by a computing device, comprising:
   acquiring an image to be processed and a target style of the image, wherein the image to be processed is of a second resolution level; and
   inputting the image to be processed and the target style into a trained image processing neural network for image processing to obtain a target image of the target style, wherein the target image is of a first resolution level, and wherein the target image of the first resolution level has a higher resolution than the image to be processed of the second resolution level,
   wherein the trained image processing neural network is trained by operations comprising:
      acquiring sample data comprising images for training;
      inputting the images for training into the image processing neural network for processing to obtain images of the first resolution level and images of the second resolution level corresponding to the images for training;
      adjusting a resolution of the images of the first resolution level based on the images of the second resolution level to obtain images of a third resolution level having the second resolution level;
      calculating a similarity between the images of the second resolution level and the images of the third resolution level;
      obtaining a total loss function of the image processing neural network based on pre-configured feature information and the similarity; and
      training the image processing neural network based on the total loss function to obtain the trained image processing neural network,
   wherein the pre-configured feature information comprises first feature information corresponding to the images for training and second feature information corresponding to the images of the second resolution level,
   wherein the first feature information comprises first content feature information and first style feature information corresponding to the images for training, and
   wherein the second feature information comprises second content feature information and second style feature information corresponding to the images of the second resolution level.

2. The method according to claim 1, wherein the first feature information and the second feature information are determined by operations comprising:
   inputting the images for training into a preset analytical neural network for processing to obtain the first feature information corresponding to the images for training; and
   inputting the images of the second resolution level into the preset analytical neural network for processing to obtain the second feature information corresponding to the images of the second resolution level.

3. The method according to claim 1, wherein training the image processing neural network based on the total loss function to obtain the trained image processing neural network comprises:

adjusting corresponding parameters of the image processing neural network to minimize the total loss function, thereby obtaining the trained image processing neural network.

4. A computing device comprising:
a memory having computer-executable instructions stored thereon; and
a processor configured to execute the computer-executable instructions to perform the image processing method of claim 1.

5. A computer-readable storage medium storing computer-executable instructions which, when executed, perform the image processing method of claim 1.

6. An image processing apparatus comprising:
an acquirer configured to acquire an image to be processed and a target style of the image, wherein the image to be processed is of a second resolution level;
a first processor configured to input the image to be processed and the target style into a trained image processing neural network for image processing to obtain a target image of the target style, wherein the target image is of a first resolution level, and wherein the target image of the first resolution level has a higher resolution than the image to be processed of the second resolution level,
wherein the image processing apparatus further comprises a trainer,
wherein, the acquirer is further configured to acquire sample data comprising images for training, and
wherein the trainer is configured to:
inputting the images for training into the image processing neural network for processing to obtain images of the first resolution level and images of the second resolution level corresponding to the images for training;
adjusting a resolution of the images of the first resolution level based on the images of the second resolution level to obtain images of a third resolution level having the second resolution level;
calculating a similarity between the images of the second resolution level and the images of the third resolution level;
obtaining a total loss function of the image processing neural network based on pre-configured feature information and the similarity; and
training the image processing neural network based on the total loss function to obtain the trained image processing neural network,
wherein the pre-configured feature information comprises first feature information corresponding to the images for training and second feature information corresponding to the images of the second resolution level,
wherein the first feature information comprises first content feature information and first style feature information corresponding to the images for training, and
wherein the second feature information comprises second content feature information and second style feature information corresponding to the images of the second resolution level.

7. The apparatus according to claim 6, further comprising a second processor configured to perform operations comprising:
inputting the images for training into a preset analytical neural network for processing, thereby obtaining the first feature information corresponding to the images for training; and
inputting the images of the second resolution level into the preset analytical neural network for processing, thereby obtaining the second feature information corresponding to the images of the second resolution level.

8. The apparatus according to claim 6, wherein the trainer is further configured to adjust corresponding parameters of the image processing neural network to minimize the total loss function, thereby obtaining the trained image processing neural network.

* * * * *